No. 607,689. Patented July 19, 1898.
W. JACKSON.
BASKET MACHINE.
(Application filed July 16, 1897.)
(No Model.) 7 Sheets—Sheet 1.

WITNESSES:

INVENTOR
W. Jackson
BY
ATTORNEYS.

No. 607,689. Patented July 19, 1898.
W. JACKSON.
BASKET MACHINE.
(Application filed July 16, 1897.)
(No Model.) 7 Sheets—Sheet 3.
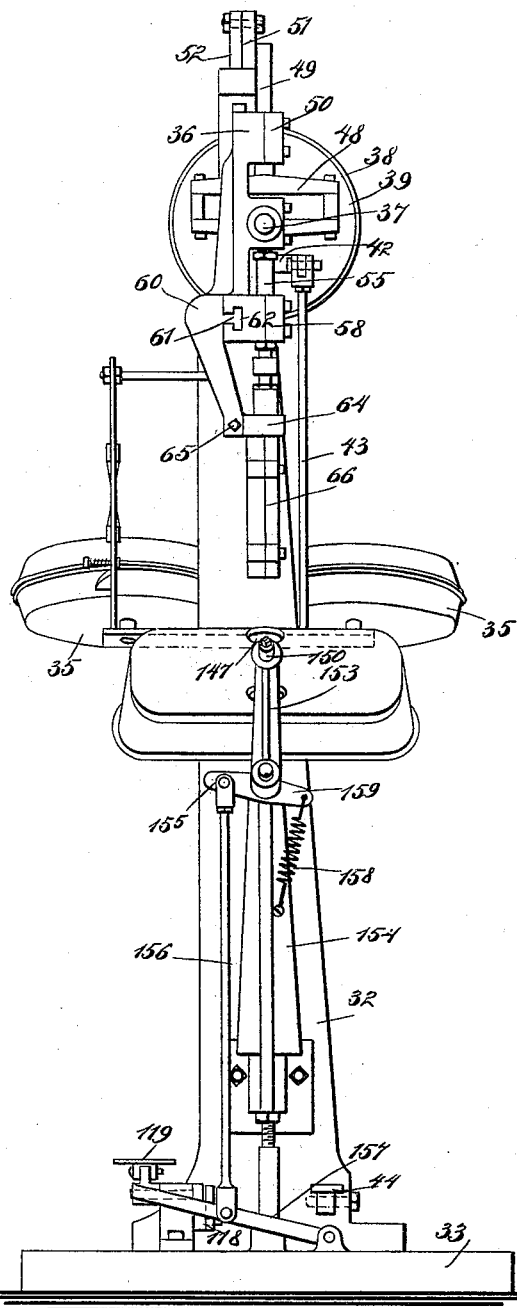
WITNESSES: Fig. 3
INVENTOR
W. Jackson.
BY
ATTORNEYS.

No. 607,689. Patented July 19, 1898.
W. JACKSON.
BASKET MACHINE.
(Application filed July 16, 1897.)
(No Model.) 7 Sheets—Sheet 4.
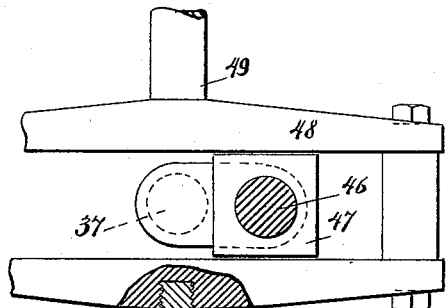
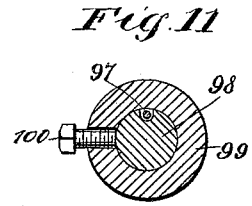
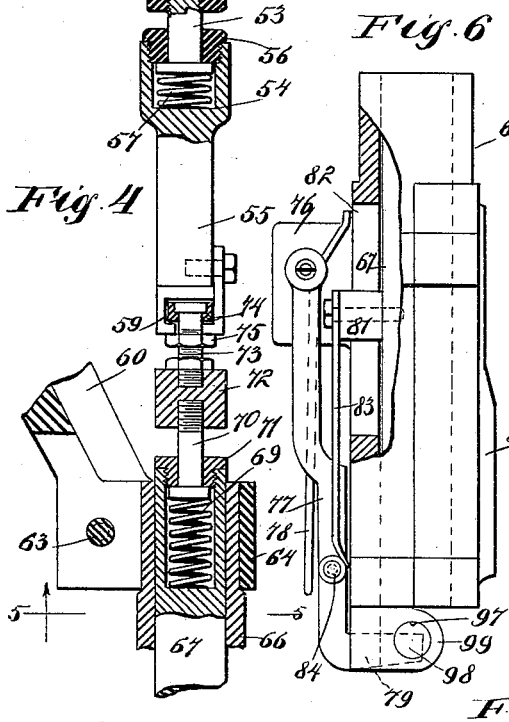
WITNESSES:
INVENTOR
W. Jackson,
BY
ATTORNEYS.

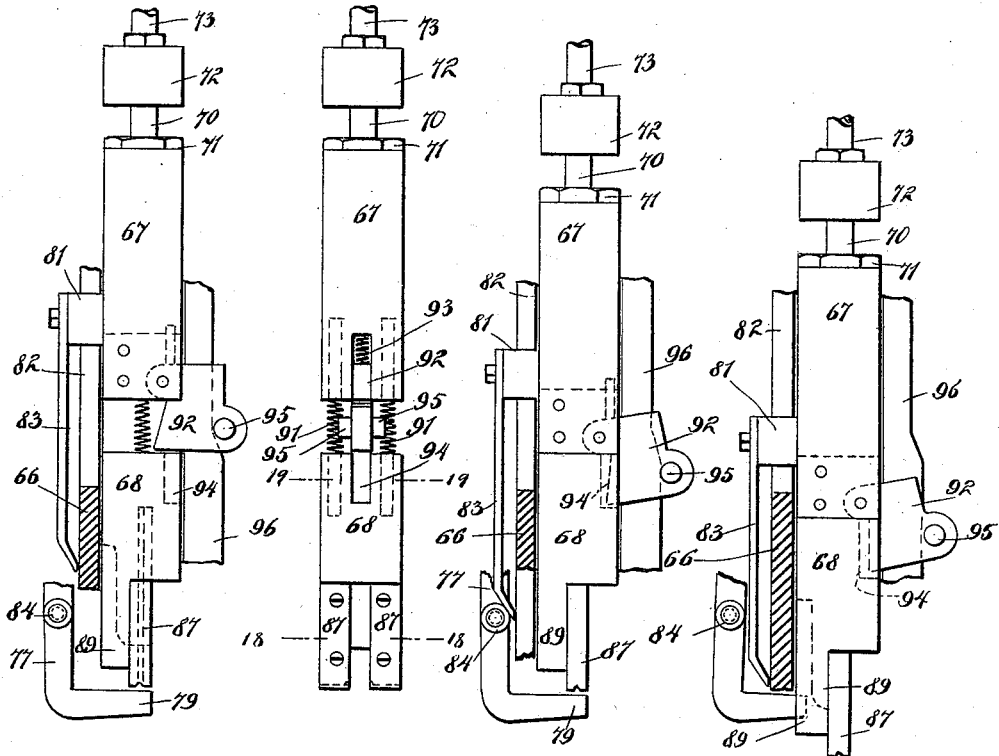

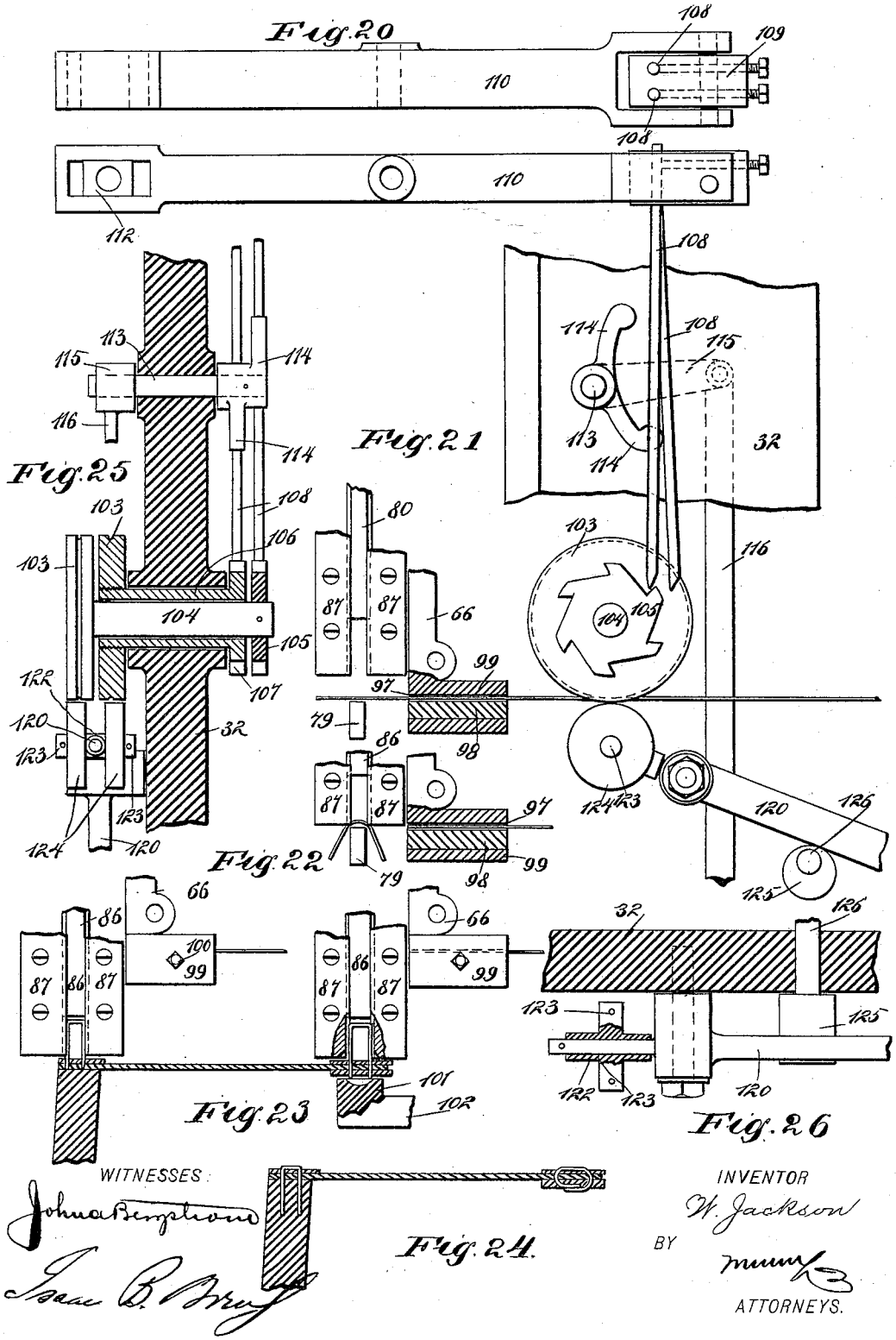

No. 607,689. Patented July 19, 1898.
W. JACKSON.
BASKET MACHINE.
(Application filed July 16, 1897.)
(No Model.) 7 Sheets—Sheet 7.

WITNESSES:
Joshua Bergstrom
Isaac B. Owen

INVENTOR
W. Jackson
BY
ATTORNEYS.

THE NORRIS PETERS CO., PHOTO-LITHO., WASHINGTON, D. C.

UNITED STATES PATENT OFFICE.

WILLIAM JACKSON, OF TRAVERSE CITY, MICHIGAN.

BASKET-MACHINE.

SPECIFICATION forming part of Letters Patent No. 607,689, dated July 19, 1898.

Application filed July 16, 1897. Serial No. 644,764. (No model.)

*To all whom it may concern:*

Be it known that I, WILLIAM JACKSON, of Traverse City, in the county of Grand Traverse and State of Michigan, have invented a new and Improved Basket-Machine, of which the following is a full, clear, and exact description.

This invention is a machine for making baskets, and is in general characterized by means for forming staples from continuous lengths of wire and for driving said staples, said means coacting with a work-holder on which the basket is formed and by which the materials of the basket are held during the process of bending and driving the staples.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1:
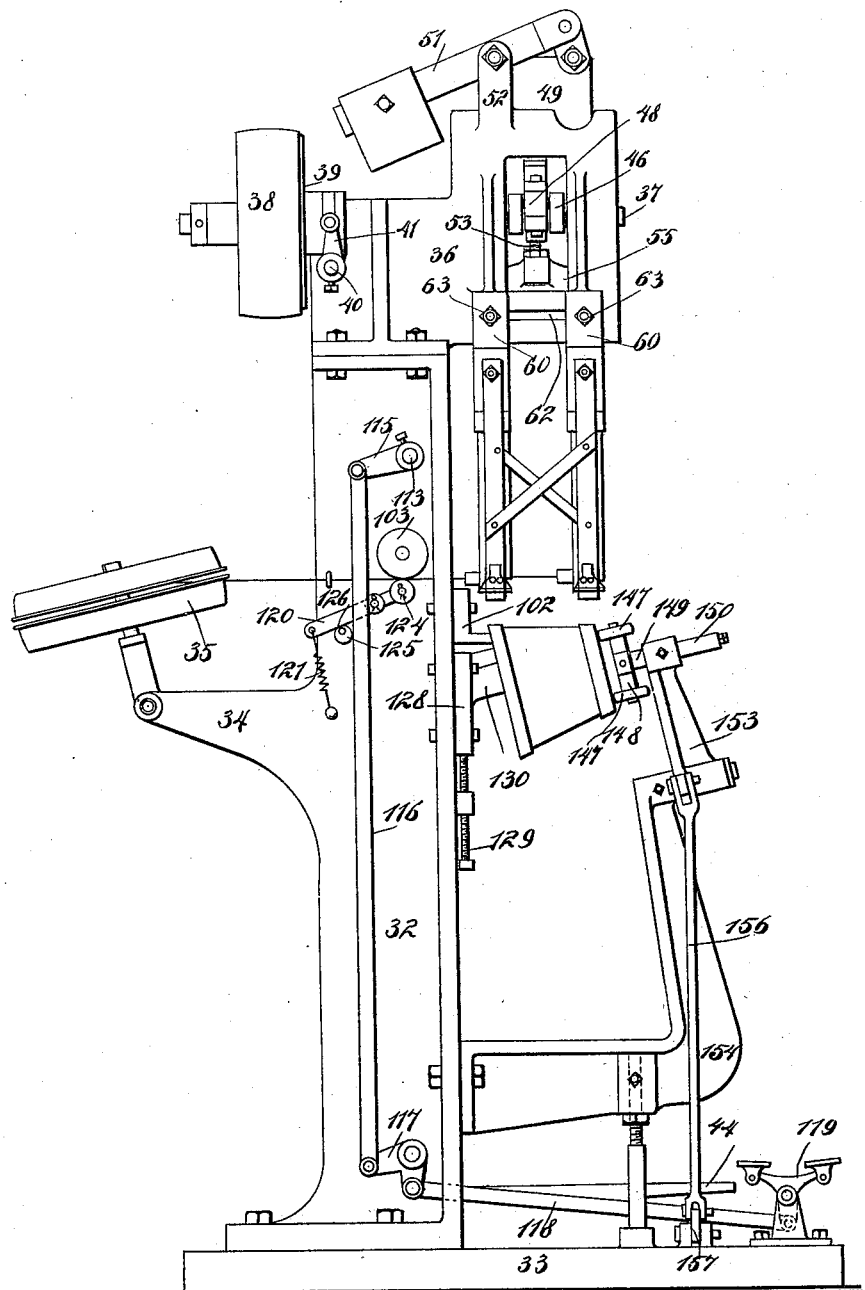
Figure 2:
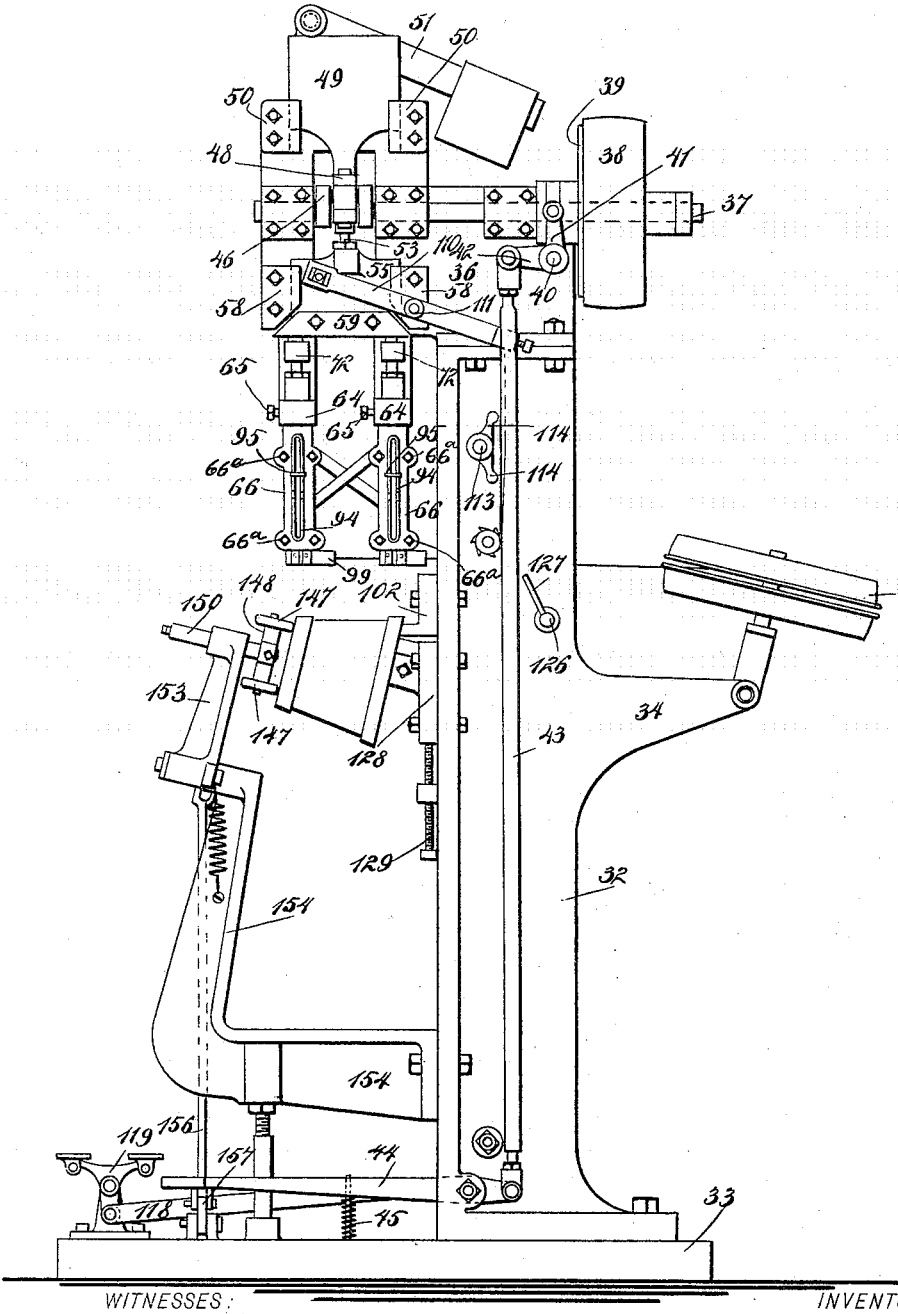
Figure 29:
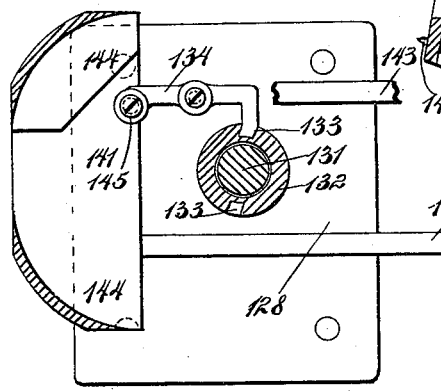
Figure 27:
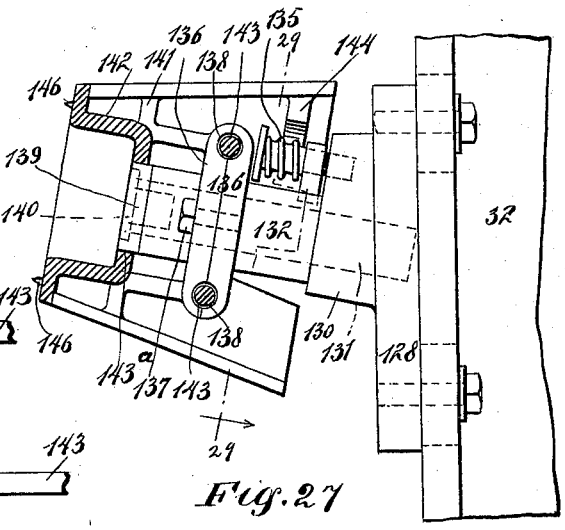
Figure 30:
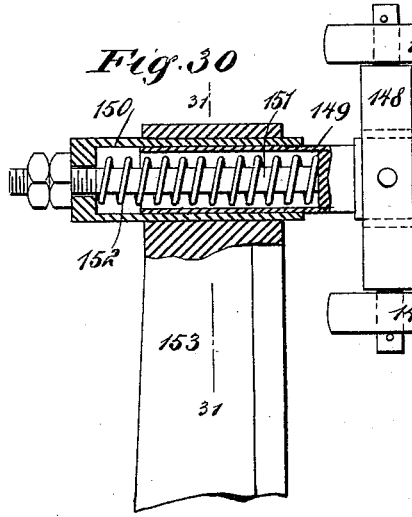
Figure 28:
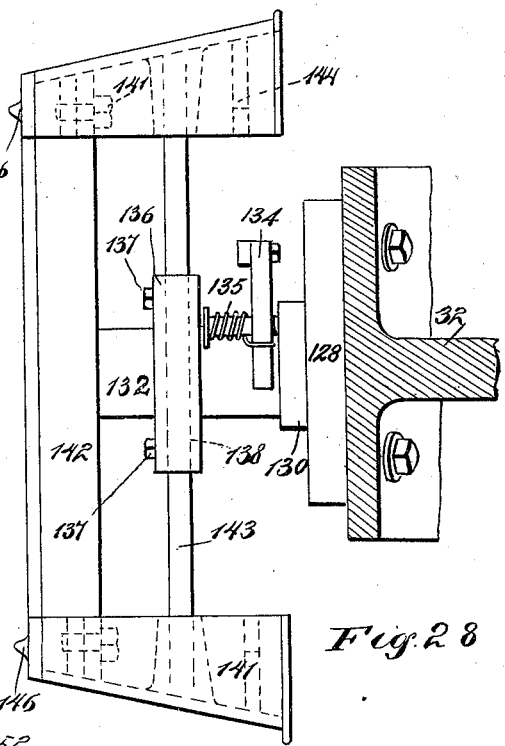
Figure 31:
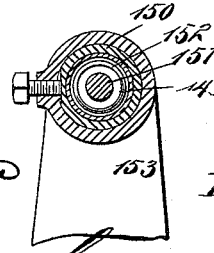

Figure 1 is an elevation of the right-hand side of the machine. Fig. 2 is an elevation of the left-hand side of the same. Fig. 3 is a front elevation of the same. Fig. 4 is a fragmentary section illustrating the upper portion of the staple forming and driving device and the means for imparting movement thereto. Fig. 5 is a section on the line 5 5 of Fig. 4, looking in the direction of the arrow in Fig. 4. Fig. 6 is a fragmentary front elevation of the shell for inclosing the lower portion of the staple forming and driving device. Fig. 7 is an elevation of the left-hand side of said shell. Fig. 8 is an elevation of the right-hand side of said shell. Fig. 9 is a fragmentary front elevation of said shell, showing parts in different positions. Fig. 10 is a sectional view on the line 10 10 of Fig. 9, looking in the direction of the arrow in Fig. 9, some of the parts shown in Fig. 9 being omitted from Fig. 10. Fig. 11 is a sectional view on the line 11 11 of Fig. 7. Fig. 12 is a front elevation of the staple forming and driving device and showing fragments of the inclosing shell. Fig. 13 is a left-hand side elevation of the staple forming and driving device. Fig. 14 is a front elevation of said device, with fragments of the inclosing shell shown in relative positions. Fig. 15 is also a front elevation of said device, with parts in different positions. Fig. 16 is a front elevation of the staple-driver and the part which carries the same, the elements adjacent to the staple-driver being removed in the interest of clearness. Fig. 17 is a right-hand side elevation of the elements shown in Fig. 16, partly in section, on the line 17 17 in Fig. 13. Fig. 18 is an enlarged section on the line 18 18 of Fig. 13. Fig. 19 is a similar section on the line 19 19 of Fig. 13. Fig. 20 is a plan view of the lever for actuating the staple-feed. Fig. 21 is a fragmentary elevation showing the device for feeding the staple-wire and also illustrating the action of the wire severing and bending elements. Fig. 22 is a view illustrating the said severing and bending elements in different positions. Fig. 23 is a view further illustrating the development of the operation of the said severing and bending devices, the view also illustrating the relative position of the basket. Fig. 24 is a fragmentary section of the basket, showing the manner of binding the parts thereof. Fig. 25 is a sectional view illustrating the wire-feeding device. Fig. 26 is a fragmentary and sectional plan showing portions of the wire-feed. Fig. 27 is a section taken through the work-holder, the supports thereof being shown in elevation. Fig. 28 is a plan view of the work-holder. Fig. 29 is a sectional front elevation of part of the work-holder. Fig. 30 is a detail section illustrating the presser-foot for holding the bottom of the basket on the work-holder, and Fig. 31 is a detail section on the line 31 31 of Fig. 30.

The column 32 of the machine stands on a base 33, and approximately midway of the column a bracket 34 projects rearward to carry two wire-reels 35, from which two strands of wire are drawn. Bolted to the top of the column 32 is the head-frame 36 of the machine.

Mounted in the head-frame 36 is a revoluble horizontal shaft 37, on which is mounted a drive-pulley 38, controlled by a friction-clutch 39. The friction-clutch 39 is actuated by a shaft 40, mounted in the head-frame 36 of the machine. The shaft 40 runs transversely through the head-frame 36 and carries a fixed arm 41 at each end, said arms being connected with the clutch 39. The left-hand end of the shaft 40 has an arm 42, connected with a vertically-running rod 43, which extends down near the base 33 and is pivoted to a pedal 44, normally raised by an expansive spring 45, seated on the base 33. By these means the clutch 39 is operated and the revolution of the shaft 37 controlled.

The head-frame 36 has a portion broken out, and across this break the shaft 37 extends. The shaft 37 has a double crank 46, located in the said break of the head-frame. Carried by the crank 46 is a rectangular block 47, that works in a horizontal elongated yoke 48, whereby as the shaft 37 turns a vertically-reciprocating motion is imparted to the yoke 48. A crown-plate 49 moves vertically in guideways 50, held at the top of the head-frame 36. The lower portion of the crown-plate 49 is attached to the yoke 48, while the upper portion is pivoted to a weighted lever 51. The lever 51 is fulcrumed on an arm 52, standing rigidly on the head-frame 36. The weighted lever 51 acts to lift the crown-plate 49, and consequently the yoke 48, serving to give such parts a tendency to a certain normal position. A bolt 53 is screwed into the lower portion of the yoke 48 and is held rigidly thereto by a jam-nut. The lower end of the bolt 53 has a head confined within a socket 54 at the top of a plate 55, such confinement being effected by a bushing 56, screwing into the said socket 54. Confined within the socket 54 is an expansive spring 57, that presses upward on the bolt 53. By these means a cushioned connection is effected between the yoke 48 and the plate 55. The plate 55 is held to reciprocate vertically in guideways 58, bolted on the head-frame 36. The lower edge of the plate 55 carries a rigidly-attached and horizontally-disposed channel-iron 59, which has the lower edges of its side walls turned inward to form an undercut groove or passage in which portions of the staple forming and driving device are held.

The apparatus has two duplicate staple forming and driving devices, one for the top hoop and one for the bottom hoop of the basket. These devices are held, respectively, by brackets 60, and each bracket has a dovetail 61, one of which is shown in Fig. 3. These dovetails are respectively transversely adjusted in a dovetail groove 62, formed horizontally in the lower overhanging portion of the head-frame 36. The brackets 60 are held rigidly by bolts 63, passing through the brackets and into the said overhanging portion of the head-frame 36. The brackets 60 project downward and inward below the overhanging portion of the head-frame 36. The lower end of each bracket 60 is formed with a yoke 64, which may be enlarged and contracted by the action of bolts 65. The yokes 64 respectively clamp and rigidly hold the upper portions of the shells 66 of the staple forming and driving devices. The shell 66 is made in two sections, as indicated in Figs. 6 and 9, said sections being provided with matching ears held together by bolts 66ª. The staple forming and driving devices are duplicates, each having an upper or main member 67 and a lower or staple-forming member 68. The upper members 67 have each a cavity containing an expansive spiral spring 69, pressing on the headed lower end of a screw 70, projecting into the cavity and sliding through a bushing 71, screwed into the upper end of the said cavity. These screws 70 have their upper ends rigidly connected with blocks 72, which in turn are rigidly connected with screws 73, passing upward into the channel-irons 59. The headed upper ends of the screws 73 carry blocks 74, which are clamped against the channel-irons 59 by means of jam-nuts 75. By these means the staple forming and driving devices are rigidly connected with the reciprocating plate 55. This connection may be at any desired transverse position on the channel-iron 59, the adjustment being rendered easier by the horizontal dispositions of the channel-irons.

The shells 66 for holding the staple forming and driving devices have open upper and lower ends. The right side of each shell has an outwardly-projecting lug 76, which carries a stub-shaft on which is pivoted an arm 77, pressed on by a spring 78, also carried on said stub-shaft, said arm 77 having at its lower end a foot 79, disposed horizontally and normally extending into an opening 80, formed in the lower portion of the shell 66. The upper members 67 of the driving and forming devices, respectively, reciprocate vertically through the shells 66. Each member 67 carries a spacing-block 81, that projects through a vertically-disposed slot 82, formed in the corresponding shell 66. Each block 81 carries a downwardly-running cam-plate 83, the lower end of which is bent inward toward the corresponding shell. As the members 67 of the forming and driving devices reciprocate they move the cam-plates 83, so that their inwardly-bent ends will respectively engage antifriction-rollers 84, two of which are carried on each arm 77, the cam-plates 83 being split to embrace their respective arms 77, as shown best in Fig. 8. By these means the arms 77 are normally kept in such position that their feet 79 extend into the recesses 80. When, however, the members 67 of the forming and driving devices descend, the plates 83 act to throw the arms 77 outward to the position shown in Fig. 9.

Attached rigidly to the lower end of the member 67 of the forming and driving device and located at the left-hand side of the longitudinal center thereof is the downwardly-projecting driving-tool 85. The lower end of each tool 85 has a vertically-extending plate 86, the edgewise disposition of which is transverse to the edgewise disposition of the main portions of the driving-tools 85. Each edge of the plates 86 has a rib thereon, these ribs running in grooves formed in the contiguous vertical edges of the hardened steel plates 87, two of which are provided for each forming and driving tool, and which in each forming and driving tool are secured to the plain left-hand face of the semicircular portion 89 at the lower extremity of the bending member 66 of the forming and driving tool. The plates 87 project downward beyond the said semicircular projection 89 and have transverse grooves formed in their lower ends to receive a wire in the operation of bending the same, as will hereinafter more fully appear. The main portions of the driving-tools 85, as shown in Fig. 19, slide through vertically-extending grooves 90, formed in the upper portion of the bending members 68 of the forming and driving devices. By this means the members 68 are respectively held to slide vertically on the driving-tools 85, which in turn are supported by and in one sense form parts of the upper members 67 of the forming and driving devices. Two expansive spiral springs 91 are provided for each forming and driving device, such springs having their ends carried in recesses respectively formed in the members 67 and 68 and serving to hold the members 68 downward from the members 67. Pivoted to the lower portion of each member 67 and to the right from the driving-tools 85 is a dog 92, pressed downward by a spring 93 and having its operating-point arranged at its lower inner corner, so as to engage the top of the corresponding member 68 and hold said member spaced from the corresponding member 67. Each member 68 has a groove 94 formed therein, which groove 94 is located in vertical line with the dog 92. The dogs 92 normally engage the member 68 inward from the upper portions of the grooves 94, but when the dogs 92 are thrown outward they disengage said tops of the members 68 and permit the members to move upward, causing the lower portions of the dogs 92 to be respectively received within the grooves 94. This throwing outward of the dogs 92 is effected by two projections 95, that are carried rigidly on each dog and project oppositely from each side thereof. The dogs 92 respectively project through slots formed in the left-hand sides of the shells 66 and respectively bounded by ribs 96. The ribs 96 have intermediately-located cam portions designed to be engaged by the projections 95, which projections normally run along the outer edges of the ribs. Consequently when the said driving and forming devices descend in the shells 66 the projections 95 will at a certain moment be engaged with the cam portions of the ribs 96, whereupon the dogs 92 will be thrown outward to permit the members 67 and 68 to have relative movement toward each other. In actual operation this outward movement of the dogs 92 causes the downward movement of the members 68 to cease and permits the members 67, with their driving-tools 85, to continue their downward movement, which results in the driving of the staple, the staples having been formed by the movement in unison of the members 67 and 68. The wire is fed over the feet 79, so that as the members 67 and 68 move downward on their corresponding feet 79 the plates 87 of each forming device will span the respective feet 79 and bend the wire over said feet, as shown in Figs. 21, 22, and 23. Two strands of wire are used, one strand for each forming and driving device. Each strand of wire is held in a groove 97, which grooves are formed in cylindrical blocks 98, kept rigidly in casings 99 by means of set-screws 100, as best shown in Fig. 11. The blocks 98 may be turned within the casings 99, so as to properly conduct the wire to the forming and driving devices. The casings 99 form parts of the shells 66 and are carried at the lower extremities thereof and project inward toward the column 32 of the machine. (See Fig. 2.)

Figs. 21, 22, and 23 show the action of the forming and driving devices on the wire. The strands of wire pass from their respective blocks 98 over the respective feet 79 of the arms 77 and beneath the respective pairs of plates 87. As the shaft 37 revolves, the yoke 48 is reciprocated vertically, which imparts a corresponding movement to the members 67 and 68 of the forming and driving devices. The dogs 92, being respectively engaged with the members 68, cause the said members to move downward. The first step in the operation of forming the staple is therefore the engagement of the lower ends of the plates 87 with the strands of wire. This operates first to sever a length of wire by the movement of the innermost plate 87 of a certain forming and driving device past the inner end of the corresponding block 98. This operation is shown in Fig. 22. Fig. 21 shows the position of the parts immediately before the severing of the wire. The instant the wire is severed the severed portion is carried down over the corresponding foot 79 by the action of the plates 87 straddling the said foot. When the plates 87 have moved down so as to straddle the foot 79, the formation of the staple will be completed, it being understood that the vertical portions or legs of the staple respectively lie within the grooves that are formed in the inner edges of the plates 87, such grooves also serving to receive the ribs on the plates 86 of the driving-tool. The action of the parts is so timed that when this complete formation of the staple is effected the projections 95 of the dogs 92 will engage the cam portions of the rib 96, causing the dogs 92 to be thrown outward and stopping the downward movement of the members 68. The downward movement of the member 67 will continue, however, which causes the driving-tool 85 to descend relatively to the member 68. The lower end of the plate 86 of the driving-tool will now engage the top of the staple, as shown in Fig. 23, and as the downward movement of the plate 86 progresses the staple will be forced downward into the work, as Fig. 23 illustrates.

This operation of the plates 87 to form the staple and of the plates 86 to drive the staple is effected during one downward movement of the plate 55. This plate reciprocates continuously between its vertical guideways, and each downward movement of the plate results in the formation and driving of two staples, one staple for each forming and driving device. As the plate 55 moves backward or upward the normal positions of the staple forming and driving devices are recovered, and when said plate 55 makes a second descent the forming and driving devices begin again to operate. Half of the downward stroke of the plate 55 is transmitted to the plates 87, causing them to form a staple, and then the last half of the downward movement of the plate 55 is transmitted alone to the members 66 and 85 and causes the latter members to drive the staple. The foremost forming and driving device affixes the staple in the bottom of the basket, as indicated in Fig. 23, while the rearward forming and driving device affixes the staple in the welt which forms the upper edges of the sides of the basket. It is necessary, therefore, for the staples produced by the rearward forming and driving device to be clenched against the welt. This is effected by means of a clenching-block 101, that is held by a bracket 102, secured to and projecting forward from the column 32. Figs. 1 and 2 show the bracket 102, and Fig. 23 shows the position of the clenching-block 101 relative to the coacting parts. When the plates 87 have reached the limit of their downward movement and the staple is formed, as shown in Fig. 23, the action of the parts is so timed that the cam-plate 83 will be moved against its corresponding rollers 84, so as to throw the arm 77 to the right and move the foot 79 from beneath the staple, so that the staple will be permitted to move downward freely under the action of the plate 86. The plates 87 are formed of hardened cast-steel, while the member 68 may be of softer metal. This enables the plates 87 to be constructed in the most effective manner without great expense in the building of the complete apparatus.

I have now described the staple forming and clenching mechanism, as well as the parts for driving and controlling the same. I will next describe the devices for feeding the strands of wire to the staple forming and driving devices. This mechanism is shown particularly in Figs. 20, 21, 25, and 26 and generally in Figs. 1, 2, and 3. From the reels 35 the two strands of wire pass, respectively, beneath the grooved feed-disks 103, held at the right-hand side of the column 32. The outer disk 103 is fixed on a shaft 104, extending through the column 32 and carrying at its left-hand end a ratchet-disk 105. The inner disk 103 is fixed on a hollow shaft 106, also projecting through the column 32 and surrounding the shaft 104. The left-hand end of the shaft 106 has a ratchet-wheel 107, matching the ratchet-wheel 105. By means of these ratchet-wheels 105 107 a step-by-step rotary motion is imparted to the disks 103. The ratchet-wheels 105 107 are respectively engaged by spring-pawls 108, rigidly carried in a rocking block 109, mounted in the forked rear end of a lever 110. The lever 110 is mounted on a centrally-disposed fulcrum formed by a stub-shaft 111, projecting outward from the block that forms the rear guideway 58. The front end of the lever 110 has an elongated recess carrying a sliding block 112, receiving a pin projecting from the plate 55. Consequently as the plate 55 moves up and down the lever 110 is rocked on its horizontal fulcrum, and the pawls 108 are moved vertically to turn the ratchet-wheels 105 and 107. The veneer of which the basket is formed, together with the board composing the bottom of the basket and the hoops or straps that embrace the basket, are held on the holder or form, which will be hereinafter described. The two staple forming and driving devices operate simultaneously, so as to form the staples and drive them with the same rapidity both at the top and bottom of the basket. Normally the pawls 108 are respectively engaged with the ratchet-wheels 105 and 107, and therefore said ratchet-wheels are turned together, and consequently the two strands of wire are fed together. It is possible, however, to cause one of the pawls to disengage its ratchet-wheel while the other pawl is engaged with its ratchet-wheel, therefore causing one strand of wire to be fed to the exclusion of the other. This is desirable at certain periods during the formation of the basket. To attain this end, I mount in the column 32 of the machine a rock-shaft 113, on the left-hand end of which are fixed two arms 114, which arms respectively engage with the pawls 108, and the disposition of the arms 114 is such that by rocking the shaft 113 the arms 114 will be alternately moved to push the pawls 108, so that either pawl may be thrown out of engagement with its ratchet-wheel, according to the desire of the operator. The right-hand end of the shaft 113 has an arm 115 fixed thereon. Pivoted to the arm 115 is a rod 116, which extends down along the right-hand side of the column 32 and is connected at its lower end to a bell-crank 117, mounted on the column near the base 33. The bell-crank lever 117 is also connected with a link 118, extending forward and approximately horizontally to a treadle 119, mounted on the base 33. This treadle 119 may be rocked forward and back, so as to throw the link or rod 118 simultaneously, whereupon the shaft 113 may be shifted as desired. When the shaft 113 and the connected parts are in an intermediate position, both pawls 108 will engage with their respective ratchet-wheels 105 and 107; but by throwing the shaft 113 to either side one of the pawls will be thrown out, as best shown in Fig. 21. Pivoted to the right-hand side of the column 32 is a lever 120, the rear end of which is thrown down by a retractile spiral spring 121, the forward end of which carries a tube 122, mounted to roll on the forward end of the lever and having two oppositely-projecting trunnions 123, whereon are respectively mounted the friction-wheels 124. The friction-wheels 124 respectively bear against the disks 103, so as to cause the proper pressure against the strands of wire, the spring 121 serving to press the wheels 124 against the disks 103. An eccentric 125, mounted on a shaft 126, journaled in the column 32, is in position to engage the lever 120 and throw said lever downward at its forward end, so as to disengage the wheels 124 from the disks 103. By these means the feed of the wire may be stopped. The left-hand end of the shaft 126 projects beyond the corresponding side of the column 32 and carries an arm 127, by which the shaft may be operated.

I will now describe the holder for the material of which the basket is formed.

A plate 128 is bolted to the front face of the column 32, so as to be vertically adjustable thereon, such adjustment being assisted by a screw 129, working in a lug formed on the column 32 and bearing against the lower edge of the plate 128. Fitted in the plate 128 and in an offset 130 thereof is a stub-shaft 131, the disposition of which is at an incline upward from the horizontal, so that the sides of the basket, which sides bulge outward, will be held horizontally during the operation of constructing the basket. Turning on the shaft 131 is a barrel 132, which is provided with two oppositely-disposed notches 133. The notches 133 are alternately engaged by a latch 134, pivoted on the offset 130 of the plate 128 and pressed by a spring 135, which spring is carried on the stub-shaft that forms the pivot or fulcrum for the latch 134. By these means the barrel 132 may be locked at one of two positions axially on the shaft 131. The barrel 132 is formed with two latching-plates 136, held together by screws 137 and having grooves on their faces, whereby passages 138 are formed for a purpose that will be hereinafter described. The outer end of the barrel 132 has a head 139, which is counterbored to receive the head of a screw 140, that serves to hold the barrel 132 revolubly on the shaft 131. The head 139 of the barrel 132 is oblong for a purpose that will appear hereinafter.

The basket holder or form proper consists of two end sections 141, rigidly joined to each other by a bottom section 142. The end sections 141 are also rigidly connected by two rods 143, which respectively slide through the passages 138, formed between the plates 136. The bottom section 142 has a longitudinally-elongated slot 143ª formed therein, through which slot the head 139 of the barrel 132 projects, so that the section 142 and the rigidly-connected parts may slide on the barrel 132, the head 139 of the barrel engaging the bottom section 142, whereby the parts are held in engagement with each other and receive the impact of the staples. By these means the form proper may slide on the barrel 132. The latch 134 holds the barrel from turning on the shaft 131. When, however, the latch is disengaged, the barrel is free to turn, which permits the form proper to be adjusted to place any side of the basket uppermost. The material held by the form proper may thus be presented to the staple-driving devices at any desired position. Each end section 141 of the form proper has a rib 144. These ribs have their inner edges inclined and are so juxtaposed to the latch 134 that they will engage with an antifriction-roller 145, carried on the right-hand end of said latch. In use the form is moved from the left to the right on the barrel 132 until one of the ribs 144 engages with the roller 145, whereupon the latch 134 will be lifted out of that recess 133 with which the latch was previously engaged, and the operator may then turn the barrel 132, so as to change the position of the form. The form being turned one-half revolution will place the barrel 132 so that the latch 134 may by the action of the spring 135 drop into the next recess. When the form has been reversed, the side of the basket that is placed uppermost by said reversal may then be nailed by moving the form along from left to right, as before explained.

The bottom section 142 of the form proper has a series of spurs 146, designed to engage in the bottom of the basket, so as to assist in holding said bottom on the form. This holding of the bottom of the basket is effected by means of two wheels 147, carried on a bar 148, pivoted to a tube 149, which in turn slides in a tube 150. A rod 151, carried by the tube 149, holds an expansive spiral spring 152, which presses against the tubes 149 and 150 and throws the tube 149 inward. The tube 150 is held rigidly in an arm 153, pivoted to the upper end of an elbow-shaped bracket 154, adjustably carried on the column 32 of the machine. The wheels 147, bearing against the bottom of the basket, cause the projections 146 to enter into said bottom, and by these means the bottom is held on the form. The arm 153 is rocked alternately, so as to throw the wheels 147 on and off of the bottom by means of an arm 155, fixed to the lower portion of the arm 153 and pivoted to a rod 156, that projects downward and has connection with a treadle-lever 157. By operating this treadle the arm 153 may be thrown to the right against the tension of a retractile spiral spring 158, attached to an arm 159, similar to the arm 155, but projected oppositely therefrom and from the bracket 154.

In using the apparatus the board of which the bottom of the basket is to be formed is placed against the section 142 of the holder, before which the treadle 157 should have been operated to throw the arm 153 laterally.

When the bottom of the basket is in place, the arm should be permitted to return by the action of the spring 158, whereupon the board forming the bottom of the basket will be held. The basket is now started by placing the inside hoop (see Fig. 24) around the form and by nailing together the ends of the same. A section of veneer should now be placed in position and covered by the outer hoops or straps. This work should be done manually. The shaft 37 is now started to revolution by the action of the treadle-lever 44, whereupon the staple forming and driving devices will start to operate. The staples will be simultaneously driven into the top and lower straps or hoops of the basket unless it be desired to drive them separately, which is accomplished, as before explained, by the action of the shaft 113 and the arms 114 thereof. When the first section of veneer is secured, a second one should be placed in position, and so on until the basket is finished. When the basket is completed, the arm 153 is moved laterally, and the finished basket may then be removed from the holders.

Having thus described my invention, I claim as new and desire to secure by Letters Patent—

1. The combination of a column, a head-frame carried at the top thereof and having an opening, a crown-plate lying flat against the head-frame and vertically reciprocatory thereon at a point above the opening thereof, a yoke attached to the crown-plate and extending through said opening, a shaft mounted on the head-frame and having a crank located in the broken-out portion, a wrist-pin of the crank being in connection with the yoke to vertically reciprocate the yoke, a plate located flat against the head-frame, and beneath the yoke and sliding vertically on the head-frame and having connection with the yoke, and a staple forming and driving tool attached to the second-named plate and operated thereby.

2. The combination of a column, a head-frame carried at the top of the column and having an opening, a shaft mounted on the head-frame and having a crank swinging in the said opening, a crown-plate carried at the upper portion of the head-frame above the opening and vertically reciprocatory against the slide of the head-frame, a yoke movable in the opening of the head-frame and having connection with the crank and also having connection with the crown-plate, a second plate vertically reciprocal on the head-frame and connected with the lower portion of the yoke, a staple forming and driving tool in connection with the second plate, a lever in connection with the second plate and rocked thereby, wire-feeding devices leading to the staple forming and driving tool, and means actuated by the lever for driving said wire-feeding devices.

3. The combination with a support, of a basket-holder or form thereon, a bracket projecting out from said support, an arm mounted to swing on the bracket, the arm swinging in the plane of the bottom of the basket-holder or form, a spring actuating said arm, means for moving the arm against the tension of the spring, and antifriction-wheels yieldingly supported by the arm and capable of engaging with the bottom of the basket-holder or form.

4. In a basket-making machine the combination of a column, staple forming and driving devices mounted thereon, means for operating said devices, a lever in connection with and operated by said means, pawls carried by the lever, wire-feeding devices driven by the pawls, a rock-shaft having arms fixed thereto, the arms engaging the pawls to control the same, a crank in connection with the rock-shaft, a rod connected with the crank, and a treadle having connection with the rod to move the same whereby to control the feed of wire to the staple forming and driving devices.

5. In a basket-machine the combination of a column, a drive-shaft mounted revolubly at the top thereof, a plate connected with the drive-shaft to be vertically reciprocated thereby, staple forming and driving devices in connection with and operated by the plate, a lever having sliding connection with the plate and rocked by the movement thereof, wire-feeding devices, means for driving the wire-feeding devices from the lever, a rock-shaft, arms attached to the rock-shaft and controlling said means for driving the wire-feeding devices, a crank attached to the rock-shaft, a rod in connection with the crank, and a treadle having connection with the rod to throw the rock-shaft.

6. In a basket-machine, the combination of a column, a head-frame carried by the column and having an opening therein, a shaft revolubly mounted on the head-frame and extending across the column, a crown-plate mounted to reciprocate above the opening, a cross-head in connection with the crown-plate and extending through the opening in the head-frame, a crank on the shaft to vertically reciprocate the cross-head, a plate located below the opening and in connection with and driven by the cross-head, a weighted lever in connection with the crown-plate, and staple forming and driving devices in connection with the second-named plate.

WILLIAM JACKSON.

Witnesses:
GEORGE TARBUCK,
GEO. M. HALL.